United States Patent
Oe

(10) Patent No.: US 12,434,683 B2
(45) Date of Patent: Oct. 7, 2025

(54) VEHICLE, AND CONTROL METHOD OF VEHICLE

(71) Applicant: TOYOTA JIDOSHA KABUSHIKI KAISHA, Toyota (JP)

(72) Inventor: Yu Oe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 324 days.

(21) Appl. No.: 18/198,334

(22) Filed: May 17, 2023

(65) Prior Publication Data
US 2024/0017711 A1 Jan. 18, 2024

(30) Foreign Application Priority Data
Jul. 14, 2022 (JP) .................................. 2022-113012

(51) Int. Cl.
| | |
|---|---|
| *B60W 20/00* | (2016.01) |
| *B60K 6/28* | (2007.10) |
| *B60K 6/46* | (2007.10) |
| *B60L 1/02* | (2006.01) |
| *B60L 50/15* | (2019.01) |
| *B60L 53/20* | (2019.01) |
| *B60L 58/18* | (2019.01) |
| *B60L 58/27* | (2019.01) |

(Continued)

(52) U.S. Cl.
CPC .............. *B60W 20/00* (2013.01); *B60K 6/28* (2013.01); *B60K 6/46* (2013.01); *B60L 1/02* (2013.01); *B60L 50/15* (2019.02); *B60L 53/20* (2019.02); *B60L 58/18* (2019.02); *B60L 58/27* (2019.02); *B60W 10/26* (2013.01); *B60W 10/30* (2013.01); *B60L 2240/545* (2013.01); *B60W 2510/246* (2013.01); *B60W 2710/246* (2013.01); *B60W 2710/305* (2013.01); *B60Y 2200/92* (2013.01)

(58) Field of Classification Search
None
See application file for complete search history.

(56) References Cited

U.S. PATENT DOCUMENTS

| 12,311,805 B2 * | 5/2025 | Hettrich | .................. B60L 58/24 |
| 2008/0143281 A1 * | 6/2008 | Yaguchi | ................ H01M 10/42 |
| | | | 318/471 |

(Continued)

FOREIGN PATENT DOCUMENTS

| GB | 2504353 A | 1/2014 |
| JP | 2001-012241 A | 1/2001 |

(Continued)

*Primary Examiner* — Erez Gurari
(74) *Attorney, Agent, or Firm* — Oliff PLC

(57) ABSTRACT

Provided is a vehicle including an internal combustion engine, a generator a traction battery, a relay, an electric motor, an auxiliary battery, an electric heater, and a controller. The controller is configured to place the relay in a cut-off state when, at the time of the internal combustion engine being started, temperature of the traction battery is lower than a first predetermined temperature, and charging the auxiliary battery with electric power generated by the generator, and supply the electric power generated by the generator to the electric heater to raise the temperature of the traction battery, until the temperature of the traction battery exceeds a second predetermined temperature that is higher than the first predetermined temperature.

6 Claims, 3 Drawing Sheets

(51) Int. Cl.
    *B60W 10/26*     (2006.01)
    *B60W 10/30*     (2006.01)

(56) References Cited

U.S. PATENT DOCUMENTS

| | | | |
|---|---|---|---|
| 2015/0061605 A1 | 3/2015 | Yamazaki et al. | |
| 2016/0020496 A1* | 1/2016 | Burrows | B60L 15/20 |
| | | | 429/62 |
| 2016/0186644 A1 | 6/2016 | Murata | |
| 2017/0225586 A1* | 8/2017 | Zhang | B60L 58/18 |
| 2017/0256833 A1* | 9/2017 | Ciaccio | H01M 16/00 |
| 2018/0022229 A1* | 1/2018 | Handley | B60W 20/00 |
| | | | 701/22 |
| 2019/0308490 A1* | 10/2019 | Obuchi | B60H 1/00314 |
| 2020/0269724 A1* | 8/2020 | Takazawa | B60K 11/02 |
| 2022/0250506 A1* | 8/2022 | Goldman-Shenhar | |
| | | | G01C 21/3469 |
| 2023/0029384 A1* | 1/2023 | Zhao | H01M 10/663 |

FOREIGN PATENT DOCUMENTS

| | | |
|---|---|---|
| JP | 2001-169404 A | 6/2001 |
| JP | 2012-029464 A | 2/2012 |
| JP | 2014-208504 A | 11/2014 |
| JP | 2015174601 A | 10/2015 |
| JP | 2015-220082 A | 12/2015 |
| JP | 2015-225782 A | 12/2015 |
| JP | 2016-124378 A | 7/2016 |
| JP | 2018-37193 A | 3/2018 |
| JP | 20212904 A | 1/2021 |
| WO | 2015/181614 A1 | 12/2015 |

\* cited by examiner

VEHICLE, AND CONTROL METHOD OF VEHICLE

CROSS-REFERENCE TO RELATED APPLICATION

This application claims priority to Japanese Patent Application No. 2022-113012 filed on Jul. 14, 2022, incorporated herein by reference in its entirety.

BACKGROUND

1. Technical Field

The present disclosure relates to a vehicle, and more particularly relates to a vehicle equipped with a generator that generates electric power when an internal combustion engine is in operation, and a control method of the vehicle.

2. Description of Related Art

Japanese Unexamined Patent Application Publication No. 2015-225782 (JP 2015-225782 A) discloses an electric power storage system for a vehicle that travels using electric power from an externally-chargeable battery, in which a battery heater is provided to raise the temperature of the battery. When the temperature of the battery is no higher than a predetermined temperature, part of external electric power is supplied to the battery heater to raise the temperature of the battery. In the electric power storage system disclosed in JP 2015-225782 A, part of the external electric power is used to raise the temperature of the battery, in order to suppress deterioration in charging efficiency and input/output of the battery due to the increase in internal resistance of the battery as a consequence of lower battery temperature.

SUMMARY

In a hybrid electric vehicle (HEV) equipped with a generator that generates electric power when an internal combustion engine is in operation, the generator generates electric power once the internal combustion engine (engine) is started. Electric power generated by the generator is charged to a traction battery when the HEV is stopped.

When temperature of the traction battery is low, internal resistance increases and an amount of electric power that can be charged to the traction battery decreases. Charging beyond the amount of electric power that can be charged leads to advance in deterioration of the traction battery. For example, when the traction battery is a lithium-ion battery, a great charging current at low temperatures will cause lithium deposition, and deterioration will advance.

The present disclosure relates to a vehicle equipped with a generator that generates electric power when an internal combustion engine is in operation, in which deterioration of a traction battery is suppressed and the temperature of the traction battery can be raised when the internal combustion engine is started at a low temperature, and to a control method thereof.

A first aspect of the present disclosure relates to a vehicle including an internal combustion engine, a generator, a traction battery, a relay, an electric motor, an auxiliary battery, an electric heater, and a controller. The generator is coupled to an output shaft of the internal combustion engine, and is configured to generate electric power when the internal combustion engine is in operation. The traction battery is configured to be charged by the electric power generated by the generator. The relay is configured to be able to cut off connection between the generator and the traction battery. The electric motor is coupled to driving wheels, and is configured to be driven by electric power stored in the traction battery. The electric heater is configured to raise a temperature of the traction battery. The controller is configured to: when at a time of the internal combustion engine being started the temperature of the traction battery is lower than a first predetermined temperature, (i) place the relay in a cut-off state, charge the auxiliary battery with the electric power generated by the generator, and (ii) supply the electric power generated by the generator to the electric heater to raise the temperature of the traction battery, until the temperature of the traction battery exceeds a second predetermined temperature that is higher than the first predetermined temperature.

A control method of a vehicle according to a second aspect of the present disclosure relates to a control method of a vehicle including an internal combustion engine, a generator, a traction battery, a relay, an electric motor, an auxiliary battery, an electric heater, and a controller. The generator is coupled to an output shaft of the internal combustion engine, and is configured to generate electric power when the internal combustion engine is in operation. The traction battery is configured to be charged by the electric power generated by the generator. The relay is configured to be able to cut off connection between the generator and the traction battery. The electric motor is coupled to driving wheels, and is configured to be driven by electric power stored in the traction battery. The electric heater is configured to raise a temperature of the traction battery. The control method of the vehicle includes: when the temperature of the traction battery is lower than a first predetermined temperature at a time of the internal combustion engine being started, (i) placing the relay in a cut-off state, and charging the auxiliary battery with the electric power generated by the generator; and (ii) supplying the electric power generated by the generator to the electric heater to raise the temperature of the traction battery, until the temperature of the traction battery exceeds a second predetermined temperature that is higher than the first predetermined temperature.

According to the vehicle according to the first aspect and the control method of the vehicle according to the second aspect, the electric motor of the vehicle is driven by electric power stored in the traction battery. The traction battery is coupled to the output shaft of the internal combustion engine, and is charged with electric power generated by the generator that generates electric power during operation of the internal combustion engine. The controller of the vehicle places the relay, which is capable of cutting off connection between the generator and the traction battery, in a cut-off state when, at the time of the internal combustion engine being started, the temperature of the traction battery is lower than the first predetermined temperature, and charges the auxiliary battery with the electric power generated by the generator, and supplies the electric power generated by the generator to the electric heater to raise the temperature of the traction battery, until the temperature of the traction battery exceeds the second predetermined temperature that is higher than the first predetermined temperature.

When the internal combustion engine is started in order to heat inside of a vehicle cabin at low temperatures, and so forth, the generator generates electricity. When the temperature of the traction battery is lower than the first predetermined temperature, charging the traction battery with the electric power generated by the generator may cause deterioration of the traction battery to advance. When the temperature of the traction battery is lower than the first predetermined temperature when the internal combustion engine is started, the controller cuts off the relay capable of cutting off the connection between the generator and the traction battery, and accordingly charging of the traction battery is not performed, and deterioration of the traction battery can be suppressed.

When the temperature of the traction battery is lower than the first predetermined temperature when the internal combustion engine is started, the controller charges the auxiliary battery with the electric power generated by the generator, and supplies the electric power to the electric heater to raise the temperature of the traction battery. The temperature of the traction battery is raised until the temperature of the traction battery reaches the second predetermined temperature that is higher than the first predetermined temperature. The electric power generated by the generator is consumed by the auxiliary battery and the electric heater, and accordingly an appropriate electric power balance can be maintained. Also, the temperature of the traction battery is raised by the electric heater, and accordingly input/output performance of the traction battery can be recovered at an early stage.

In the vehicle according to the first aspect of the present disclosure, the controller may be configured to, when a surplus of the electric power generated by the generator occurs, operate one or a plurality of devices, of a block heater of the internal combustion engine, an electric heater for heating inside of the vehicle cabin, a defroster, and a defogger, until the temperature of the traction battery exceeds the second predetermined temperature.

According to the vehicle of this configuration, when there is a surplus of the electric power generated by the generator, supplying surplus power to one or a plurality of some optional devices that the vehicle is equipped with, even just for a certain period of time until the temperature of the traction battery exceeds the second predetermined temperature, enables electric power to be effectively consumed.

In the vehicle according to the first aspect of the present disclosure, a power conversion device may further be provided between the generator and the traction battery. A direct current (DC)-to-DC converter may be provided that is connected to a power line between the power conversion device and the relay that is provided between the power conversion device and the traction battery, and that is configured to charge the auxiliary battery with the electric power generated by the generator, and also to supply the electric power generated by the generator to the electric heater.

According to the vehicle of this configuration, even when the connection between the traction battery and the power conversion device is cut off by placing the relay in the cut-off state, the electric power generated by the generator can be supplied to the auxiliary battery and the electric heater using the power conversion device and the DC-to-DC converter.

In the vehicle of the first aspect of the present disclosure, the controller may be configured to connect the relay when the temperature of the traction battery exceeds the second predetermined temperature.

According to the vehicle of this configuration, when the temperature of the traction battery is raised and the temperature of the traction battery exceeds the second predetermined temperature and the input/output performance recovers, the relay is connected, and the electric power stored in the traction battery can be used to drive the electric motor. Also, charging of the traction battery is enabled. The temperature of the traction battery is raised when the temperature is low, and accordingly the vehicle can be enabled to travel satisfactorily at an early stage.

In the vehicle of the first aspect of the present disclosure, the vehicle may further include a power split mechanism that is configured to split output torque of the internal combustion engine between the generator and the electric motor. The power split mechanism may be made up of a planetary gear mechanism that includes an input element to which the output shaft of the internal combustion engine is coupled, a reaction element to which the generator is connected, and an output element to which the electric motor is connected.

According to the vehicle having this configuration, the power split mechanism made up of the planetary gear mechanism splits the output torque of the internal combustion engine between the generator and the electric motor. When the internal combustion engine is started while the vehicle is stopped, the electric motor coupled to the output element of the planetary gear mechanism is stopped, and accordingly the generator connected to the reaction element is rotated by the output torque of the internal combustion engine, and generates electricity. The electric motor is stopped, and accordingly cannot consume electric power that is generated. The electric power that is generated is consumed by the auxiliary battery and the electric heater, and accordingly an appropriate electric power balance can be maintained.

According to the vehicle and the control method thereof of the present disclosure, in the vehicle equipped with the generator that generates electric power when the internal combustion engine is in operation, deterioration of the traction battery is suppressed and the temperature of the traction battery can be raised when the internal combustion engine is started at a low temperature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the present disclosure will be described in detail below with reference to the drawings. Note that same or equivalent parts are denoted by the same signs throughout the drawings, and description thereof will not be repeated.

Figure 1:
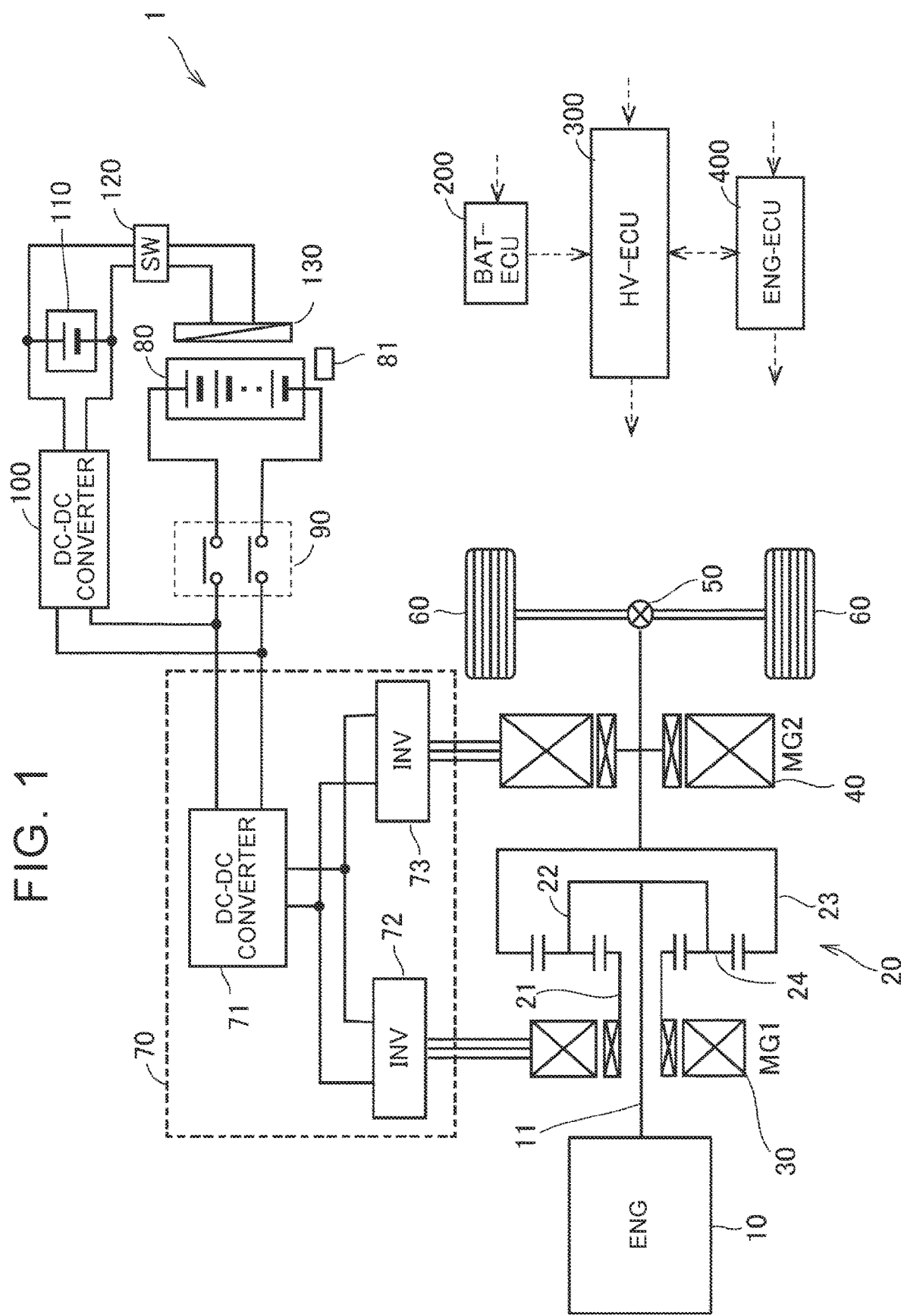
FIG. 1 is an overall configuration diagram of a vehicle according to an embodiment.

FIG. 1 is an overall configuration diagram of a vehicle 1 according to the present embodiment. The vehicle 1 is a hybrid electric vehicle that is equipped with an internal combustion engine and an electric motor as prime movers. The vehicle 1 includes an engine 10, a power split mechanism 20, a first motor generator (hereinafter referred to as "first MG") 30, a second motor generator (hereinafter referred to as "second MG") 40, a power control unit (PCU) 70, a traction battery 80, and driving wheels 60. Here, the engine 10 is an example of the internal combustion engine according to the present disclosure. The engine 10 is an internal combustion engine that outputs motive power by converting combustion energy, generated by combustion of fuel, into kinetic energy of motion elements, such as pistons and rotors.

The power split mechanism 20 splits the motive power output from the engine 10 into motive power for driving the first MG 30 and motive power for driving the driving wheels 60. The power split mechanism 20 is made up of a planetary gear mechanism, in which an output shaft 11 of the engine 10 is coupled to a carrier 22, and a rotor of the first MG 30 is coupled to a sun gear 21. A ring gear 23 is coupled to a rotor of the second MG 40, and is also coupled to the driving wheels 60 via a differential gearset 50. In the present embodiment, the carrier 22 is an input element in the planetary gear mechanism, the sun gear 21 is a reaction element therein, and the ring gear 23 is an output element therein. Note that sign 24 denotes a pinion gear.

The first MG 30 and the second MG 40 are alternating current rotating electric machines, and are three-phase alternating current synchronous electric motors in which permanent magnets are embedded in a rotor, for example. The first MG 30 is mainly used as a generator that is driven by the engine 10 via the power split mechanism 20. Electric power generated by the first MG 30 is supplied to the second MG 40 or the traction battery 80 via the PCU 70.

The second MG 40 operates mainly as an electric motor to drive the driving wheels 60. The second MG 40 is driven by receiving at least one of electric power from the traction battery 80 and electric power generated by the first MG 30, and the driving force of the second MG 40 is transmitted to the driving wheels 60. On the other hand, during braking or hill descent of the vehicle 1, the second MG 40 operates as a generator to perform regenerative power generation (regenerative braking). The electric power generated by the second MG 40 is recovered to the traction battery 80 via the PCU 70.

The PCU 70 converts direct current electric power received from the traction battery 80 into alternating current electric power for driving the first MG 30 and the second MG 40. The PCU 70 also converts alternating current electric power generated by the first MG 30 and the second MG 40 into direct current electric power for charging the traction battery 80. The PCU 70 includes, for example, a first inverter 72 provided corresponding to the first MG 30, a second inverter 73 provided corresponding to the second MG 40, and a converter 71 that boosts direct current voltage that is supplied to each inverter, to voltage of the traction battery 80, or a higher voltage. Note that the PCU 70 corresponds to an example of a "power conversion device" according to the present disclosure.

The traction battery 80 is a secondary battery that is rechargeable, and is, in the present embodiment, configured as an assembled battery in which unit cells made of lithium-ion batteries are connected in series. The voltage of the traction battery 80 may be, for example, around 200 V to 300 V, and is configured as a high-voltage battery. The traction battery 80 receives electric power generated by at least one of the first MG 30 and the second MG 40 and is charged thereby. The traction battery 80 then discharges the stored electric power to supply the electric power to the PCU 70.

A system main relay (SMR) 90 is provided between the traction battery 80 and the PCU 70. Closing the SMR 90 electrically connects the traction battery 80 and the PCU 70, electric power stored in the traction battery 80 can be supplied to the second MG 40 (first MG 30), and electric power generated by the first MG 30 (second MG 40) can be charged to the traction battery 80. Also, opening the SMR 90 cuts off the connection between the traction battery 80 and the PCU 70, electric power stored in the traction battery 80 cannot be supplied to the second MG 40 (first MG 30), and electric power generated by the first MG 30 (second MG 40) cannot be charged to the traction battery 80.

A monitoring unit 81 is provided to the traction battery 80. The monitoring unit 81 includes a voltage sensor, a current sensor and a temperature sensor (all omitted from illustration) for detecting the voltage, input/output current, and temperature of the traction battery 80, respectively. The monitoring unit 81 outputs detection values of each sensor (voltage VB, input/output current IB, and temperature TB of the traction battery 80) to a battery electronic control unit (ECU) 200, hereinafter abbreviated to "BAT-ECU".

In the present embodiment, a DC-to-DC converter 100 is connected on a power line between the SMR 90 and the PCU 70. The DC-to-DC converter 100 steps down the direct current voltage supplied from the PCU 70 and the direct current voltage supplied from the traction battery 80 to the voltage of an auxiliary battery 110. The auxiliary battery 110 is charged by electric power supplied from the DC-to-DC converter 100. The auxiliary battery 110 is a power source for various types of equipment, such as headlights, a multi-information display, and so forth, of the vehicle 1, and is made up of a lead battery for example, and has a voltage of 12 V.

The vehicle 1 is provided with an electric heater 130 that heats the traction battery 80 to raise the temperature thereof. The electric heater 130 is, for example, a positive temperature coefficient (PTC) heater, which is connected to the auxiliary battery 110 via a switch 120, and is used to heat the traction battery 80 to raise the temperature thereof, using electric power supplied from the auxiliary battery 110 (supplied from the DC-to-DC converter 100).

The vehicle 1 includes the BAT-ECU 200, a hybrid ECU (HV-ECU) 300, and an engine ECU (ENG-ECU) 400. The HV-ECU 300 is an example of a controller according to the disclosure.

The HV-ECU 300 includes a central processing unit (CPU), read-only memory (ROM) for storing processing programs, random-access memory (RAM) for temporarily storing data, and an input/output port for inputting/outputting various types of signals (omitted from illustration), and so forth, and executes predetermined computation processing based on information stored in memory (ROM and RAM), and information from various types of sensors, the BAT-ECU 200, and the ENG-ECU 400. The HV-ECU 300 controls each piece of equipment, such as the PCU 70, the SMR 90, the DC-to-DC converter 100, the switch 120, and so forth, based on the results of the computation processing, and also outputs commands to the ENG-ECU 400. Note that the HV-ECU 300 corresponds to an example of "controller" according to the present disclosure.

The BAT-ECU 200 also includes a CPU, ROM, RAM, input/output ports, and so forth (all omitted from illustration). The BAT-ECU 200 calculates a State of Charge (SOC) indicating the level of charge of the traction battery 80 based on detected values of the input/output current IB and/or the voltage VB of the traction battery 80 from the monitoring unit 81. The SOC is, for example, expressed as a percentage of the current level of charge with respect to a fully-charged capacity of the traction battery 80. The BAT-ECU 200 then outputs the calculated SOC to the HV-ECU 300. Note that the HV-ECU 300 may calculate the SOC.

The ENG-ECU 400 also includes a CPU, ROM, RAM, input/output ports, and so forth (all omitted from illustration). The ENG-ECU 400 receives information from various types of sensors, and commands from the HV-ECU 300, executes predetermined computation processing, and thereby controls the engine 10.

When an ignition switch (power switch) that is omitted from illustration is turned on from a state in which a hybrid system of the vehicle 1 is turned off, the HV-ECU 300 closes (connects) the SMR 90, and also drives the first MG 30. The HV-ECU 300 also outputs a start command to the ENG-ECU 400. At this time, the second MG 40, and thus the driving wheels 60, are stopped, and accordingly the engine 10 is cranked by the first MG 30, whereby the engine 10 is started. Once the engine 10 starts, the first MG 30 is driven by output torque of the engine 10 (rotation of the output shaft 11), and electric power generated by the first MG 30 is charged to the traction battery 80.

When the traction battery 80 is at a low temperature, especially when battery temperature TB is below −30° C., internal resistance of the traction battery 80 increases and the amount of electric power that can be charged decreases. Charging beyond this amount of electric power that can be charged leads to advance in deterioration of the traction battery 80. The traction battery 80 according to the present embodiment is a lithium-ion battery, and a great charging current will cause lithium deposition at low temperatures, and deterioration will advance. Accordingly, when the engine 10 is started in order to heat inside of a vehicle cabin, or the like, at a low temperature, the first MG 30 generates electric power, and the generated electric power charges the traction battery 80, which may cause deterioration of the traction battery 80 to advance.

In the present embodiment, when the engine 10 is started while the traction battery 80 is at a low temperature, the SMR 90 is cut off to prevent the traction battery 80 from being charged, thereby suppressing deterioration of the traction battery 80. Also, the electric power generated by the first MG 30 is consumed by the auxiliary battery 110 and the electric heater 130, so as to maintain an appropriate electric power balance.

Figure 2:
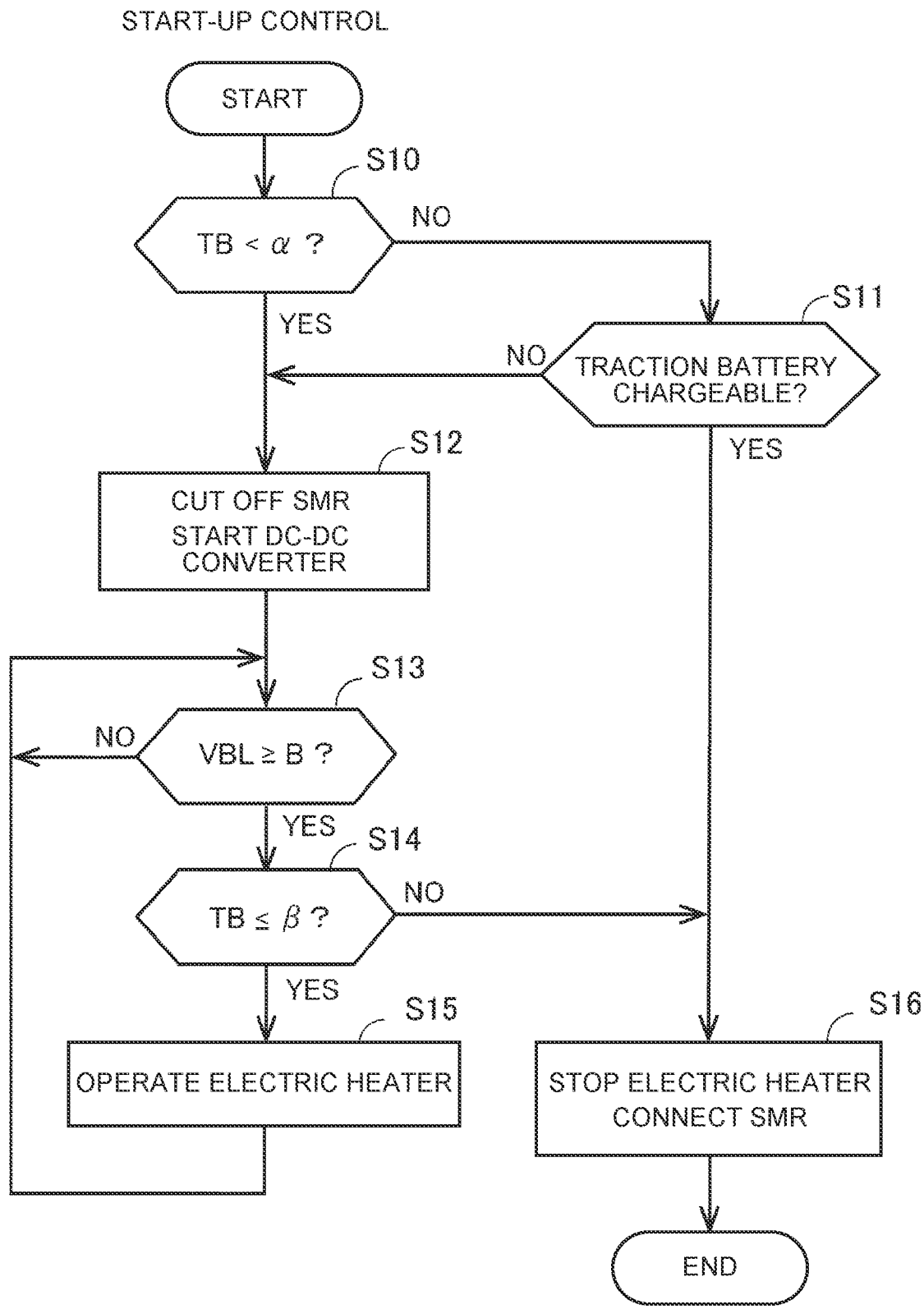
FIG. 2 is a flowchart showing an overview of start-up control executed by an HV-ECU illustrated in FIG. 1 in the embodiment.

FIG. 2 is a flowchart showing an overview of start-up control executed by the HV-ECU 300 according to the present embodiment. This flowchart is executed when the ignition switch (power switch) that is omitted from illustration is turned on, and the engine 10 is started.

When the engine 10 is started, first, in step (hereinafter, step will be abbreviated to "S") 10, determination is made regarding whether the battery temperature TB of the traction battery 80 is lower than a first predetermined temperature α. The first predetermined temperature α may be −30° C., for example. When the battery temperature TB is no lower than the first predetermined temperature α, a negative determination is made, and the flow advances to S11. When the battery temperature TB is lower than the first predetermined temperature α, an affirmative determination is made, and the flow advances to S12.

In S11, determination is made whether the traction battery 80 can be charged. For example, when the SOC of the traction battery 80 is no lower than 90%, determination is made that the traction battery 80 is fully charged, and cannot be charged. Also, determination may be made that the traction battery 80 cannot be charged in a state when the engine 10 is idling up due to warm-up operations or the like, the power generation amount of the first MG 30 is great, and the battery temperature TB is no lower than the first predetermined temperature a but the battery temperature TB is low enough to cause lithium deposition in the traction battery 80. When the traction battery 80 cannot be charged, a negative determination is made in S1 and the flow advances to S12. When the traction battery 80 can be charged, an affirmative determination is made in S11 and the flow advances to S16.

In S12, the SMR 90 is cut off(opened) and the DC-to-DC converter 100 is operated. Thus, the connection between the PCU 70 and the traction battery 80 is cut off, and charging and discharging of the traction battery 80 are not performed (charging and discharging are not permitted). Electric power generated by the first MG 30 is then supplied to the auxiliary battery 110 via the PCU 70, whereby the auxiliary battery 110 is charged.

In the subsequent S13, judgment is made regarding whether voltage (auxiliary battery voltage) VBL of the auxiliary battery 110 is no lower than a predetermined voltage B. The predetermined voltage B may be, for example, 13.5 V, and is a value indicating a state that the auxiliary battery 110 is fully charged. When the auxiliary battery voltage VBL is no lower than the predetermined voltage B, an affirmative determination is made and the flow advances to S14. When the auxiliary battery voltage VBL is lower than the predetermined voltage B, a negative determination is made and the flow returns to S13.

In S14, determination is made regarding whether the battery temperature TB of the traction battery 80 exceeds a second predetermined temperature β (determination is made regarding whether the battery temperature TB is higher than the second predetermined temperature β). The second predetermined temperature β may be 5° C., for example, and is set to a temperature higher than the first predetermined temperature α. When the battery temperature TB is no higher than the second predetermined temperature β, a positive determination is made, and the flow advances to S15. When the battery temperature TB exceeds the second predetermined temperature β, a negative determination is made, and the flow advances to S16.

In S15, the switch 120 is turned on to apply electricity to the electric heater 130 so as to heat the traction battery 80 and raise the temperature thereof, following which the flow returns to S13.

In S16, the switch 120 is turned off (when already off, the off state is maintained) to stop applying electricity to the electric heater 130, and also the SMR 90 is connected (closed) (when already connected, the connected state is maintained) and this routine ends.

According to the present embodiment, at the time of the engine 10 being started, when the battery temperature TB of the traction battery 80 is lower than the first predetermined temperature α (affirmative determination in S10), the HV-ECU 300 cuts off the SMR 90 (S12), thereby cutting off the connection between the first MG 30 (PCU 70) and the traction battery 80. Thus, the traction battery 80 is not charged, and accordingly deterioration of the traction battery 80 can be suppressed.

When the battery temperature TB of the traction battery 80 is lower than the first predetermined temperature a (affirmative determination in S10) at the time of the engine 10 being started, the HV-ECU 300 charges the auxiliary battery 110 with the electric power generated by the first MG 30, via the DC-to-DC converter 100 (S12). Also, electric power generated by the first MG 30 is supplied to the electric heater 130 to raise the temperature of the traction battery 80 until the battery temperature TB of the traction battery 80 exceeds the second predetermined temperature β that is higher than the first predetermined temperature α (S15). Thus, electric power generated by the first MG 30 can be consumed by the auxiliary battery 110 and the electric heater 130 to maintain electric power balance. The temperature of the traction battery 80 is raised by the electric heater 130, and accordingly input/output performance of the traction battery 80 can be recovered at an early stage.

Note that when the battery temperature TB of the traction battery 80 exceeds the second predetermined temperature α, and the SMR 90 is connected, the second MG 40 can be driven by the electric power stored in the traction battery 80, thus enabling charging of the traction battery 80. The temperature of the traction battery 80 is raised when the temperature is low, and accordingly the vehicle 1 can be enabled to travel satisfactorily at an early stage.

According to this configuration, when the temperature of the traction battery is raised and the temperature of the traction battery exceeds the second predetermined temperature and the input/output performance recovers, the relay is connected, and the electric power stored in the traction battery can be used to drive the electric motor. The temperature of the traction battery is raised, and accordingly the vehicle can be enabled to travel satisfactorily at an early stage.

Figure 3:
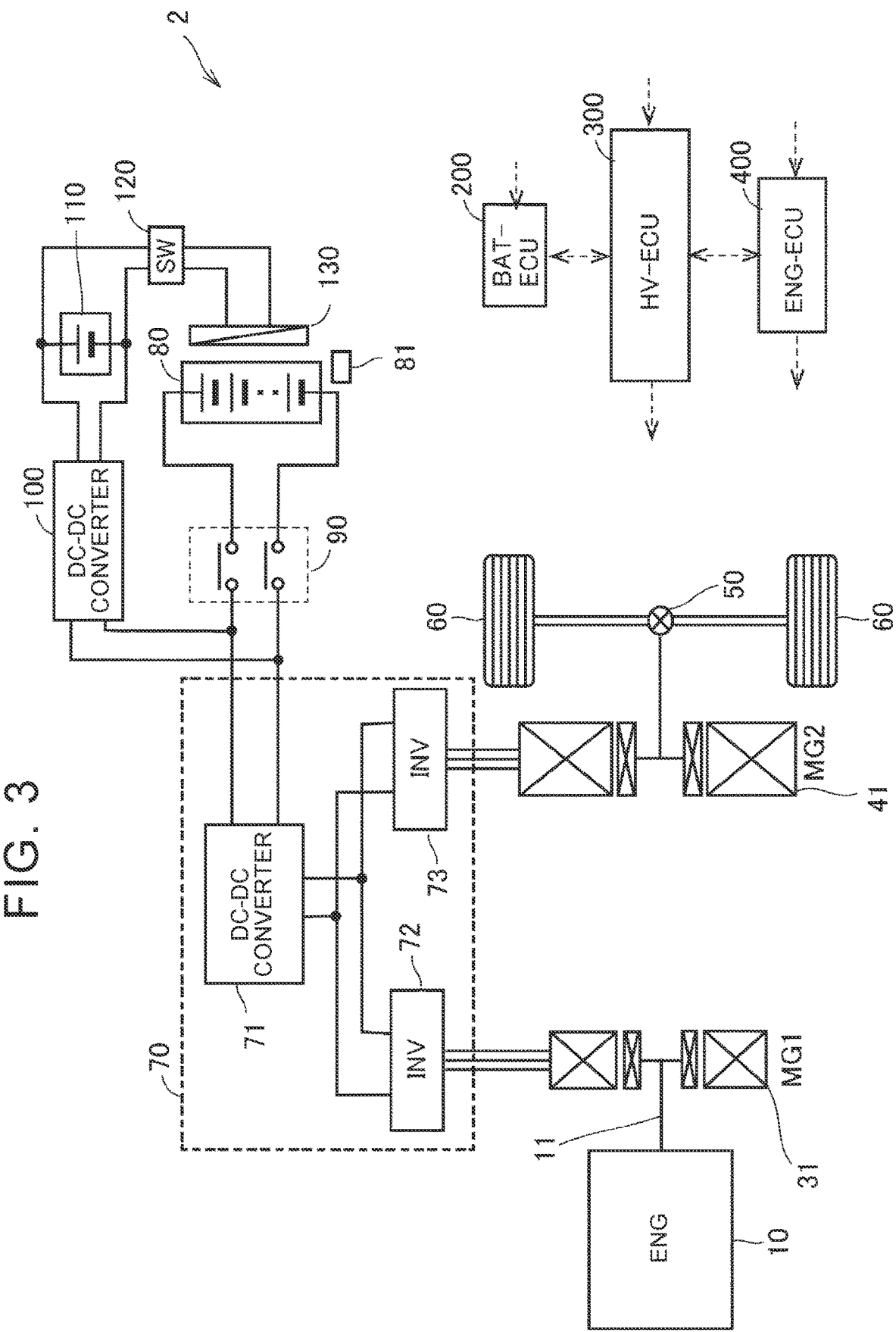
FIG. 3 is an overall configuration diagram of a vehicle according to a modification of the embodiment.

Next, a modification of the present embodiment will be described. In the above embodiment, a so-called series-parallel hybrid electric vehicle that uses the power split mechanism 20 is described. However, the vehicle according to the present disclosure is not limited to a series-parallel hybrid electric vehicle. FIG. 3 is an overall configuration diagram of a vehicle 2 according to the modification of the present embodiment. The vehicle 2 according to the modification of the present embodiment is a series hybrid electric vehicle. The vehicle 2 is not provided with the power split mechanism. In the modification of the present embodiment, a first MG 31 is a generator that is coupled to the output shaft 11 of the engine 10, and that is driven by the engine 10 to generate electric power. A rotor of a second MG 41 is coupled to the driving wheels 60 via the differential gearset 50. The second MG 41 mainly operates as an electric motor, and is driven by receiving at least one of electric power from the traction battery 80 and electric power generated by the first MG 31, and driving force of the second MG 41 is transmitted to the driving wheels 60. Other configurations are the same as those of the above-described embodiment, and description thereof will be omitted.

In this modification of the present embodiment as well, the HV-ECU 300 executes the startup control shown in FIG. 2, yielding effects and advantages the same as in the above embodiment.

Note that in the above embodiment, the electric power generated by the first MG 30 may be consumed by the auxiliary battery 110 and the electric heater 130 through the processes of S12 to S15. When a surplus of the electric power generated by the first MG 30 occurs, a block heater of the engine 10, an electric heater for heating the vehicle cabin, a defogger (a device for defogging a front window), a defroster (a device for defrosting a rear window), or the like, may be operated to consume the electric power generated by the first MG 30, until the battery temperature TB exceeds the second predetermined temperature β.

The embodiments disclosed herein shall be construed as exemplary and not restrictive in all respects. The scope of the present disclosure is set forth by the claims rather than by the above description of the embodiment, and is intended to include all modifications within the meaning and scope equivalent to those of the claims.

What is claimed is:

1. A vehicle comprising:
   an internal combustion engine;
   a generator that is coupled to an output shaft of the internal combustion engine and that is configured to generate electric power when the internal combustion engine is in operation;
   a traction battery that is configured to be charged by the electric power generated by the generator;
   a relay that is configured to be able to cut off connection between the generator and the traction battery;
   an electric motor that is coupled to driving wheels and that is configured to be driven by electric power stored in the traction battery;
   an auxiliary battery;
   an electric heater that is configured to raise a temperature of the traction battery; and
   a controller that is configured to, when at a time of the internal combustion engine being started the temperature of the traction battery is lower than a first predetermined temperature, place the relay in a cut-off state, charge the auxiliary battery with the electric power generated by the generator, and supply the electric power generated by the generator to the electric heater to raise the temperature of the traction battery, until the temperature of the traction battery exceeds a second predetermined temperature that is higher than the first predetermined temperature.

2. The vehicle according to claim 1, wherein the controller is configured to, when a surplus of the electric power generated by the generator occurs, operate one or a plurality of devices, of a block heater of the internal combustion engine, an electric heater for heating inside of a vehicle cabin, a defroster, and a defogger, until the temperature of the traction battery exceeds the second predetermined temperature.

3. The vehicle according to claim 1, further comprising:
   a power conversion device that is provided between the generator and the traction battery; and
   a direct current to direct current converter that is connected to a power line between the power conversion device and the relay, and that is configured to charge the auxiliary battery with the electric power generated by the generator, and also to supply the electric power generated by the generator to the electric heater, wherein the relay is provided between the power conversion device and the traction battery.

4. The vehicle according to claim 1, wherein the controller is configured to connect the relay when the temperature of the traction battery exceeds the second predetermined temperature.

5. The vehicle according to of claim 1, further comprising a power split mechanism that is configured to split output torque of the internal combustion engine between the generator and the electric motor, wherein the power split mechanism is made up of a planetary gear mechanism that includes an input element to which the output shaft of the internal combustion engine is coupled, a reaction element to which the generator is coupled, and an output element to which the electric motor is coupled.

6. A control method of a vehicle, the vehicle including an internal combustion engine, a generator that is coupled to an output shaft of the internal combustion engine and that is configured to generate electric power when the internal combustion engine s in operation, a traction battery that is configured to be charged by the electric power generated by the generator, a relay that is configured to be able to cut off connection between the generator and the traction battery, an electric motor that is coupled to driving wheels and that is configured to be driven by electric power stored in the traction battery, an auxiliary battery, and an electric heater that is configured to raise a temperature of the traction battery, the control method comprising: when the temperature of the traction battery is lower than a first predetermined temperature at a time of the internal combustion engine being started, placing the relay in a cut-off state, and charging the auxiliary battery with the electric power generated by the generator; and supplying the electric power generated by the generator to the electric heater to raise the temperature of the traction battery, until the temperature of the traction battery exceeds a second predetermined temperature that is higher than the first predetermined temperature.

\* \* \* \* \*